July 10, 1928. 1,676,889
G. C. DAVIS
GAS RELIEF VALVE
Filed April 11, 1923
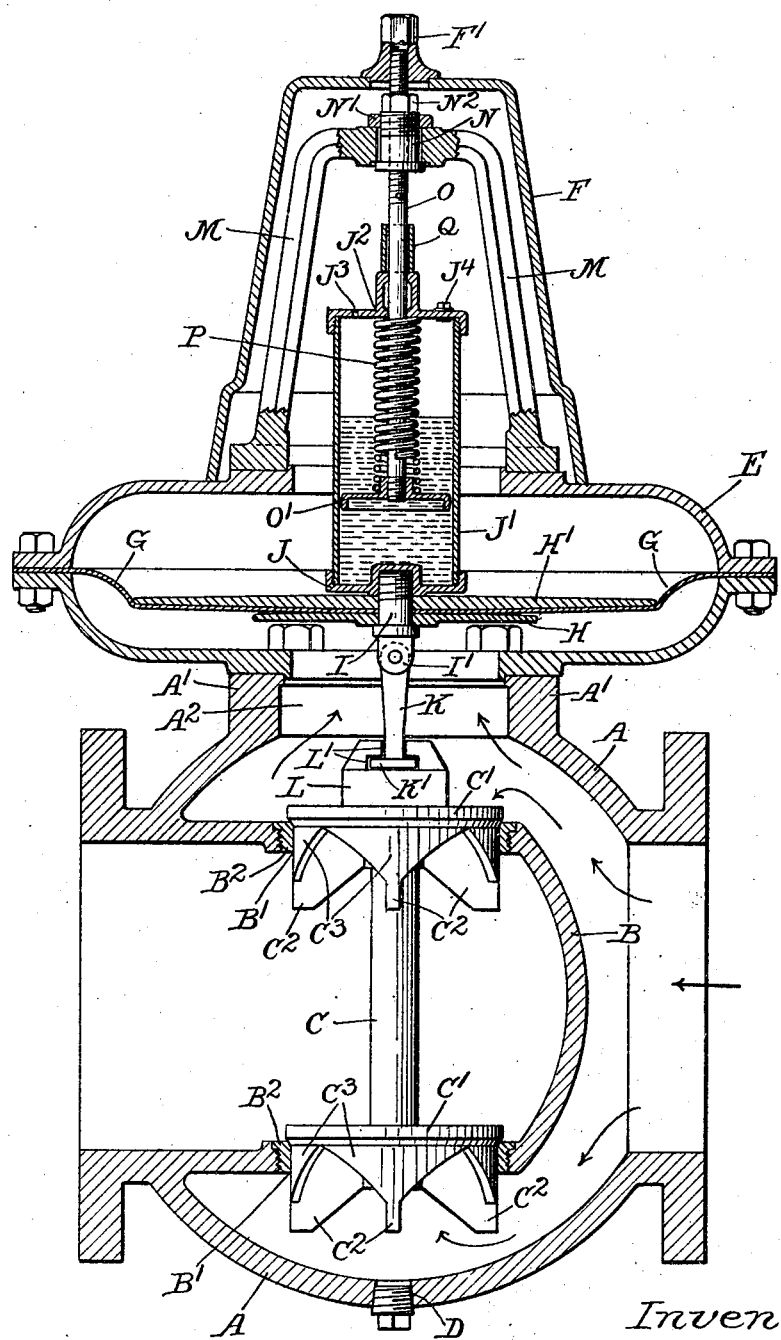
Inventor.
George C. Davis.
by Parker & Carter.
Attorneys.

Patented July 10, 1928.

1,676,889

UNITED STATES PATENT OFFICE.

GEORGE C. DAVIS, OF CHICAGO, ILLINOIS, ASSIGNOR TO G. M. DAVIS REGULATOR COMPANY, OF CHICAGO, ILLINOIS, A CORPORATION OF ILLINOIS.

GAS-RELIEF VALVE.

Application filed April 11, 1923. Serial No. 631,283.

This invention relates to a relief valve, and particularly to a gas relief valve. It is intended primarily for use in connection with gas lines through which gas comes from gas wells. It has for one object to provide means for opening an extremely sensitive valve. It has for another object to provide means in a gas supply and transmission line whereby the gas is not permitted to build up more than a very slight degree of pressure. Other objects will appear from time to time throughout the specification and claims.

My invention is illustrated in the accompanying drawing, which is a vertical cross section of the valve.

As shown the valve itself is generally of the globe type, provided with an upper housing $A^1$ into which the gas or other liquid flows. It has an opening in the top $A^2$ through which the gas may pass and through which the pressure of the gas may be exerted. Within the body A of the valve is a globe B. This globe is provided with a pair of openings $B^1$ $B^1$. In each of these openings is mounted a removable valve seat $B^2$.

The valve member is formed by a shaft C to which are fastened the two horizontal valve discs $C^1$ $C^1$. Each of these discs has downwardly depending from it a plurality of webs $C^2$ reinforced throughout a portion of their height by a curved skirt $C^3$.

The valve body A is provided in its bottom with a drain connection D in which is mounted a removable plug, which may be removed to permit liquid to be drained from the body of the valve.

Above the valve is mounted a diaphragm housing E which is preferably formed of two sections bolted together. Above this housing E is a protective housing F which is removably held in place by means of the nut $F^1$. This upper housing serves to protect the valve operating mechanism from the elements.

Within the housing E and preferably gripped between its two parts is a diaphragm G. This diaphragm may be of rubber or similar material. It is gripped between two holding plates H, $H^1$. The plate H is comparatively small in extent and the plate $H^1$ is much larger. Running through the two plates and through the diaphragm is a stud I. Screw threaded to this is a dash pot formed with a bottom J, a cylindrical portion $J^1$ and a removable top $J^2$ which is preferably screw threaded into position. The top is provided with a small breather hole $J^3$ and a removable filling cap $J^4$. The stud I is provided in its under side with a pair of ears $I^1$, between which is pivoted a connecting rod K. This rod K has an enlarged head $K^1$ on its under side. Secured to the upper end of the valve stem C is a member L adapted to engage the head $K^1$. This member is provided with a slot $L^1$ which as shown is wider at its bottom than at its top so that the head $K^1$ may slide in the larger lower portion of the slot $L^1$ and the shank of the shaft K may slide in the smaller upper portion. By this means the valve is held and supported from the shaft K which in turn is connected with the diaphragm and dash pot, and all of these parts thus rise and fall together.

Surmounting the housing E and preferably secured to it is a spider M. Mounted centrally in the spider and adjustably held therein by means of a bushing N and nuts $N^1$, $N^2$ is a shaft O. This shaft may be adjusted vertically up and down with relation to the spider M. It carries at its bottom end a wide flanged disc $O^1$ which lies within the dash pot J, $J^1$ and fits loosely therein.

Lying within the dash pot and about the shaft O and bearing at the top on the member $J^2$ and at the bottom on the disc O is a helical spring P.

Formed on the shaft O is a stop Q. This stop serves to prevent excessive upward movement of the valve diaphragm and dash pot assembly, which excessive upward movement might displace the valve and prevent proper closing.

Although I have shown an operative device, still it will be obvious that many changes in size, shape and arrangement of parts might be made without departing materially from the spirit of my invention, and I wish therefore that my showing be taken as in a sense diagrammatic.

The use and operation of my invention are as follows:

The valve of this application is intended to be used in a gas line where a very slight degree of vacuum or suction will normally prevail on one side and the valve will normally be closed. On the other side gas is in motion or storage under pressure.

It is desirable to release the gas and cause it to pass through the valve when a very slight degree of pressure is reached. The valve is self opening and thus serves as a relief valve to relieve the pressure of the gas as it accumulates in a tank or in the line. It is designed to be extremely sensitive and to respond immediately to a very slight degree of pressure.

The parts are assembled as shown in Figure 1, in which position the valve is closed. The shaft O carrying the spring and disc is adjusted so that the spring practically supports the weight of the valve, and diaphragm and dash pot assembly. When then the pressure of the gas develops it passes into the valve about the globe because the valve is still closed and is effective upward on the diaphragm. The spring raises the diaphragm which holds the dash pot assembly and carries the valve with it, opening the valve and permitting the discharge of gas through the line. The adjustment of the spring, as above noted, is such that the pressure need only be sufficient to raise a very slight portion of the weight of the valve assembly, since the valve is almost balanced by means of the spring. Correspondingly it requires only a very slight drop in pressure to cause the valve to close again to prevent discharge. The valve is thus extremely sensitive and readily responds to very low degrees of pressure and readily closes the moment that pressure no longer exists.

I claim:

1. In an automatically opening valve, a valve casing, a valve element therein, means for opening and closing said valve element in response to pressure fluctuation within said casing, said means including a diaphragm adapted to be raised by the pressure within the valve casing and to carry the valve element with it, there being mounted to rise and fall with the diaphragm a dash pot, and in combination with said dash pot a plunger supported from the valve casing, carrying within the dash pot a resisting plate adapted yieldingly to resist the movement of the valve element, and a spring, said spring within said dashpot adapted at one end to bear against said resisting plate and at the other against the interior of said dash pot, said spring adapted to support a portion of the weight of the valve element.

2. In an automatically opening valve, a valve casing, a valve element therein, means for opening and closing said valve element in response to pressure fluctuation within said casing, said means including a diaphragm adapted to be raised by the pressure within the valve casing and to carry the valve element with it, there being mounted to rise and fall with the diaphragm a dash pot, and in combination with said dashpot a plunger supported from the valve casing, carrying within the dash pot a resisting plate adapted yieldingly to resist the movement of the valve element, and a spring, said spring within said dash pot adapted at one end to bear against said resisting plate and at the other against the interior of said dash pot, said spring adapted to support a portion of the weight of the valve element, and means for varying the tension of the spring.

3. In an automatically opening valve, a valve casing, a valve element therein, means for opening and closing said valve element in response to pressure fluctuation within said casing, said means including a diaphragm adapted to be raised by the pressure within the valve casing and to carry the valve element with it, and diaphragm holding plates one on either side of said diaphragm, there being mounted to rise and fall with the diaphragm a dash pot, and in combination with said dash pot a plunger supported from the valve casing, carrying within the dash pot a resisting plate adapted yieldingly to resist the movement of the valve element, and a spring, said spring within said dash pot adapted at one end to bear against said resisting plate and at the other against the interior of said dash pot, said spring adapted to support a portion of the weight of the valve element.

4. In an automatically opening valve, a valve casing, a valve element therein, means for opening and closing said valve element in response to pressure fluctuation within said casing, said means including a diaphragm adapted to be raised by the pressure within the valve casing and to carry the valve element with it, and diaphragm holding plates one on either side of said diaphragm, there being mounted to rise and fall with the diaphragm a dash pot, and in combination with said dash pot a plunger supported from the valve casing, carrying within the dash pot a resisting plate adapted yieldingly to resist the movement of the valve element, and a spring, said spring within said dash pot adapted at one end to bear against said resisting plate and at the other against the interior of said dash pot, said spring adapted to support a portion of the weight of the valve element, and means for varying the tension of said spring.

5. In an automatic valve, a supporting frame, a plunger and means for adjusting the plunger longitudinally in the frame, a housing enclosing the plunger and frame and means including a part of the plunger for locking the housing in position to enclose the parts.

6. In an automatic valve, a frame, a plunger adjustable thereon and means for locking the plunger in adjusted position together with a housing and means including a part of the plunger for locking the housing in place to enclose the frame and plunger.

7. In an automatic valve, an entrance and exit, a reciprocatory valve element, means for opening and closing said valve element in response to pressure, said means including a diaphragm, such diaphragm adapted to be raised in response to pressure within the valve housing and to raise with it the valve element, a dash pot and a spring, the spring being adapted to support a large part of the weight of the valve assembly, the dash pot being adapted to rise and fall with the valve element.

8. In an automatically opening valve, a valve casing, a valve element therein, means for opening and closing said valve element in response to pressure fluctuation within said casing said means including a diaphragm adapted to be raised by the pressure within the valve casing and to carry the valve element with it, there being mounted in combination with the diaphragm a dash pot and plunger assembly, one portion of the assembly being mounted to rise and fall with the diaphragm and another portion being mounted in fixed position with relation to the valve casing, such dash pot assembly including a resisting plate adapted to yieldingly resist the movement of the valve element and the spring, said spring being within said dash pot and adapted at one end to bear against said resisting plate and at the other end against the resistance of the dash pot, said spring adapted to support a portion of the weight of the valve element.

Signed at Chicago, county of Cook and State of Illinois, this 2nd day of April, 1923.

GEO. C. DAVIS.